April 9, 1968
R. N. LEWIS
3,377,555
METHOD OF CALIBRATING HIGH-VOLTAGE PRECISION
RESISTANCE POTENTIAL DIVIDERS
Filed June 4, 1965
2 Sheets-Sheet 1
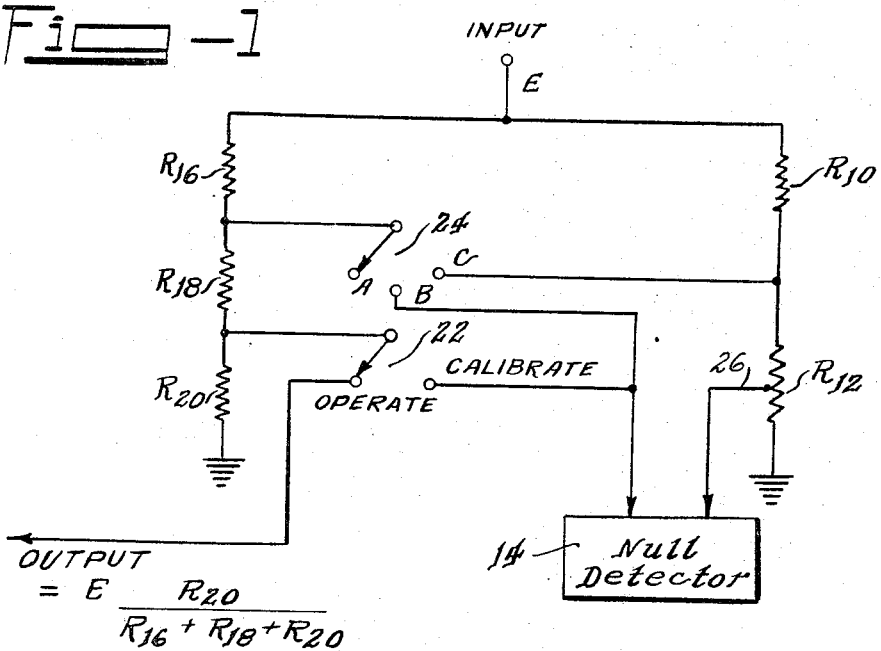
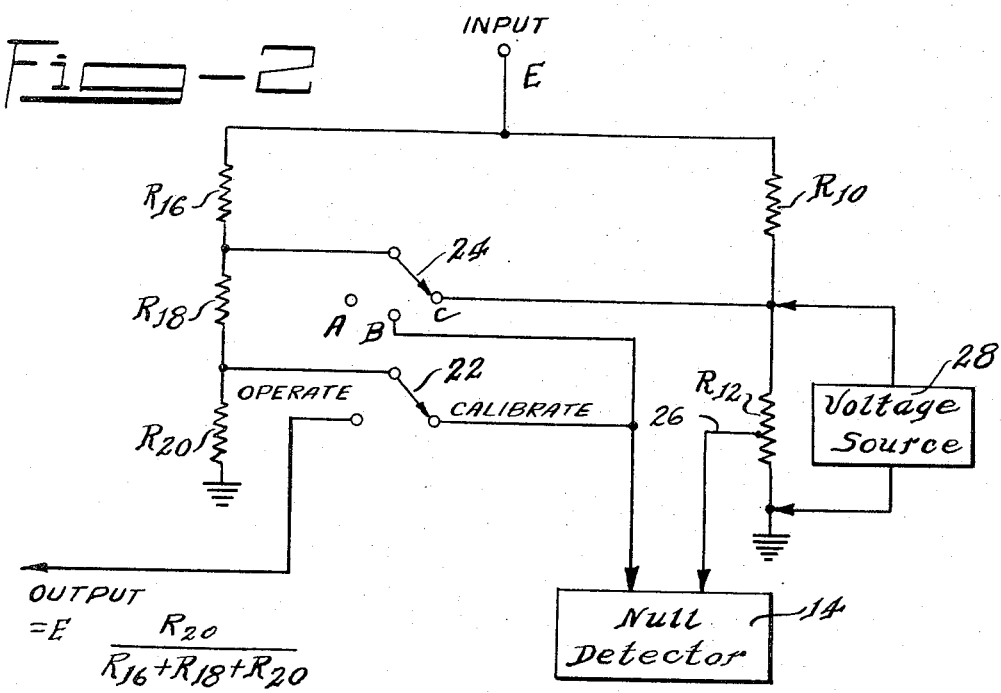
INVENTOR.
Robert N. Lewis
BY
Roland A. Anderson
Attorney

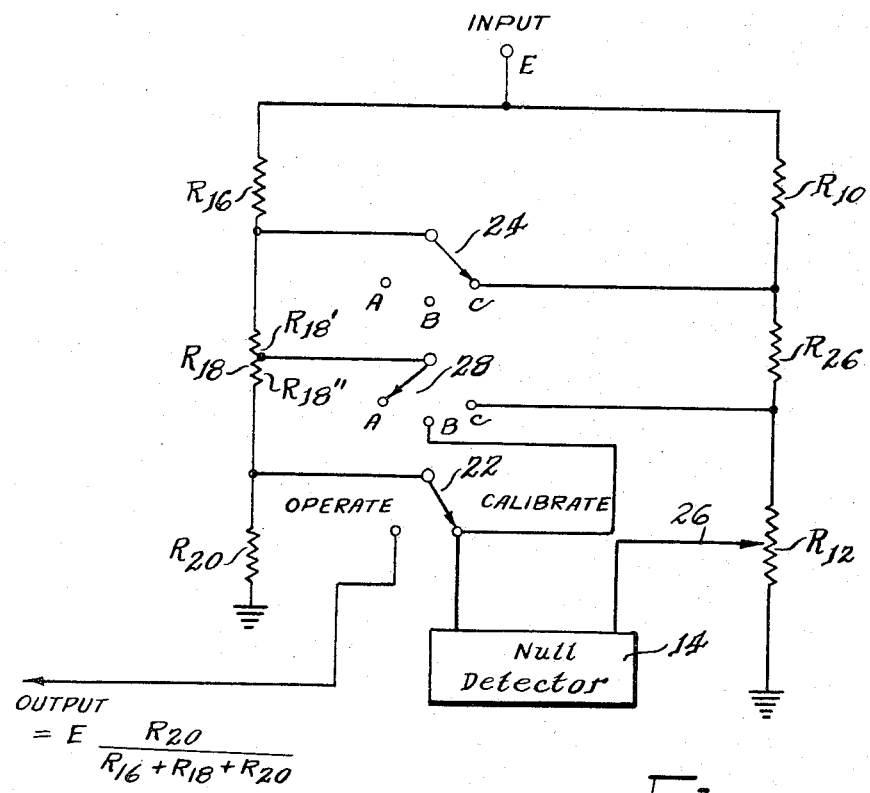
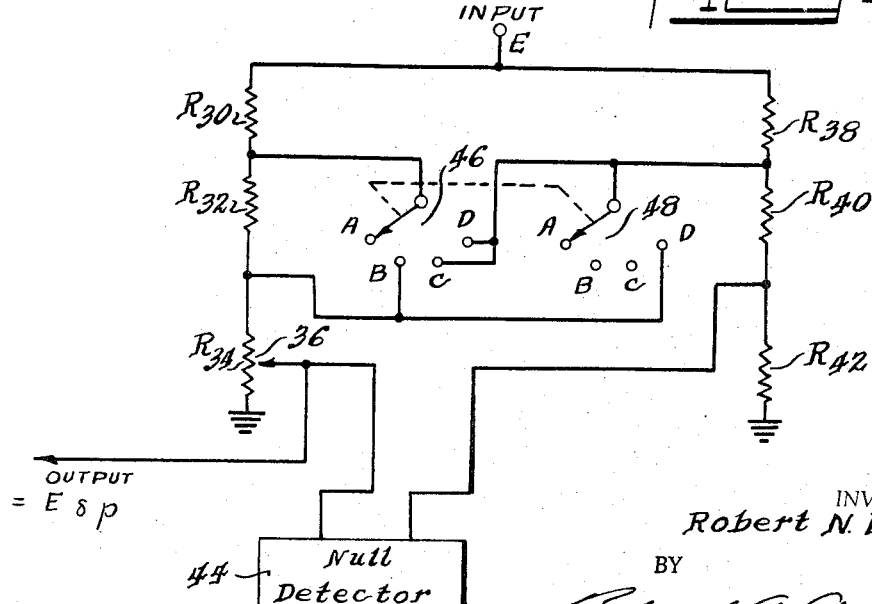

United States Patent Office 3,377,555
Patented Apr. 9, 1968

3,377,555
METHOD OF CALIBRATING HIGH-VOLTAGE PRECISION RESISTANCE POTENTIAL DIVIDERS
Robert N. Lewis, Clarendon Hills, Ill., assignor to the United States of America as represented by the United States Atomic Energy Commission
Filed June 4, 1965, Ser. No. 461,564
9 Claims. (Cl. 324—63)

This invention relates to high-voltage precision resistance potential dividers and more specifically to a method of calibration therefor.

When operating at high voltages, it is often necessary to know the value of such high voltages with great precision. The precision measurement of high voltages is usually accomplished by dividing the voltage with a precision resistance divider to a level where it may be compared with secondary standard voltage sources. For voltages less than 1000 volts, it is not too difficult to calibrate a resistance divider with great precision using standard laboratory instruments. The calibration methods depend almost exclusively upon measuring the ratios of the various resistances which are used in making up the divider and then relying entirely upon the premise that the resistance values of the resistors will not change under their operating environment when connected in series and to the voltage source being measured.

However, in constructing and calibrating precision resistance dividers for use at voltages in excess of 1000 volts, one encounters increasing difficulty because the effective values of the resistances change with applied voltage. The change in effective resistance of the resistors may be due to any or all of three conditions. The first is heating of the resistance wire due to the $E^2/R$ loss. This effect also occurs at low voltages, but the required dissipation per resistor increases as higher voltage strings are constructed, unless one is willing to tolerate an excessively large number of resistors. The second comprises current leakage through the volume or over the surface of the supporting insulators. Included in this leakage is an apparent leakage due to the displacement currents required to charge the supporting insulators. High-quality insulators can have charging time constants of several hours (due to dielectric absorption) and there will be an apparent change of resistance due to this effect lasting over this time interval. The third comprises corona discharges which may appear at locations of high potential gradient. The ionization current will appear as a leakage from the corona point and, if any of the ions are collected at other points in the precision resistance divider, there will be an apparent leak at this point with almost no hope of detecting it visually. Also other sources of ionized air will give rise to leakage currents, for example, the ionized tracks left by cosmic rays or other background radiation. Thus, it is readily apparent that it is quite difficult to accurately calibrate a precision resistance divider for operation at high voltages.

Present existent methods combine one or more of the following disadvantages. They are tedious, fairly expensive, complicated and in all cases final operating accuracy is questionable. There exists a need in the art for a method of accurately calibrating a high-voltage precision resistance potential divider under its normal operating conditions with a minimum of effort, cost and time.

Accordingly, it is one object of the present invention to provide an improved method of calibrating a precision resistance potential divider.

It is another object of the present invention to provide a method of in-circuit calibration of a precision resistance potential divider operating at voltages in excess of 1000 volts.

It is another object of the present invention to provide a method for in-circuit calibration of a precision resistance potential divider operating at potentials in excess of 1000 volts with an accuracy from 1 to 10 p.p.m.

It is another object of the present invention to provide a method of in-circuit calibration of a precision resistance variable potential divider.

Other objects of the present invention will become more apparent as the detailed description proceeds.

In general, the present invention calibrates in circuit a precision resistance potential divider having a plurality of resistance arms by a method comprising series connecting a first resistance and a calibrated potentiometer and connecting the resistance-potentiometer combination across the divider. A null-indicating device is connected across the output of the divider and the wiper arm of the potentiometer. The wiper arm of the potentiometer is adjusted until the indicating device reads a null value. Shorting is then effected across the resistance arm of the divider adjacent the output thereof and the wiper arm of the potentiometer is adjusted until the null-indicating device again reads a null value therefor. The resistance arm short is then removed and the nonoutput connected terminal of the resistance arm of the divider adjacent the output thereof is connected to the common terminal of the resistance-potentiometer combination. The wiper arm of the potentiometer is adjusted until the indicating device again reads a null value therefor. The terminal connection is then removed and calculation of the division ratio of the divider is effected from the potentiometer settings required to obtain the aforesaid null values, whereby the divider is calibrated.

Further understanding of the present invention may best be obtained from consideration of the accompanying drawings wherein:

FIG. 1 is a schematic diagram of a precision resistance potential divider together with the apparatus for the calibration thereof according to the present invention.

FIG. 2 is a schematic diagram of a precision resistance potential divider together with an apparatus for the calibration thereof according to the present invention.

FIG. 3 is a schematic diagram of a precision resistance potential divider together with an apparatus for the calibration thereof according to the present invention.

FIG. 4 is a schematic diagram of a precision resistance variable potential divider together with an apparatus for the calibration thereof according to the present invention.

The apparatus for calibrating a precision resistance potential divider according to the practice of the present invention is schematically illustrated in FIG. 1. The calibration requires a resistor $R_{10}$, a precision decade potentiometer $R_{12}$ and a null detector 14, such as a galvanometer. Resistance strings or arms $R_{16}$, $R_{18}$ and $R_{20}$ are representative of the precision resistance potential divider to be calibrated.

For calibration, the switch 22 is switched to the calibrate position. The switch 24 is maintained in its position A and the wiper arm 26 of the precision decade potentiometer $R_{12}$ is adjusted until a null is obtained on the null detector 14. The setting of the potentiometer 12 is recorded. Switch 24 is now moved to position B, thereby shorting out the resistance arm $R_{18}$ of the precision resistance potential divider, and the wiper arm 26 of potentiometer 12 is again adjusted until a null is obtained on the null detector 14. The value of the setting of potentiometer 12 is again recorded. Switch 24 is then moved to position C and the wiper arm of potentiometer 12 is adjusted until a null is obtained on the null detector 14. The value of the setting of potentiometer 12 is again recorded. The three aforesaid potentiometer recordings (called $P_1$, $P_2$, $P_3$) are then used to calculate the division ratio of the precision resistance potential divider, the division ratio of the divider being equal to $$\frac{P_2-P_1}{P_2} \cdot \frac{P_3}{1-P_3}$$

To further illustrate the above-described method, the following proof thereof is given. As previously stated, the resistor strings or arms $R_{16}$, $R_{18}$ and $R_{20}$ make up the precision resistance potential divider to be calibrated. The division ratio is $$\frac{e_{out}}{e_{in}} = \delta = \frac{R_{20}}{R_{16}+R_{18}+R_{20}} \quad (1)$$

The resistance $R_{16}+R_{18}$ makes up the greater part of the precision resistance potential divider and each resistance arm $R_{16}$ or $R_{18}$ may consist of many individual resistors. The exact values of $R_{16}$ and $R_{18}$ need not be known. Neither does their ratio need to be known. The resistance $R_{10}$ can be a low-precision string capable of supporting the applied input voltage E. The precision decade potentiometer $R_{12}$ should have a linear accuracy of anywhere from 1 to 10 p.p.m. dependent upon the final accuracy desired. With the switch 24 in position A and switch 22 in the calibrate position and $R_{12}$ adjusted for a null reading on null detector 14, one can write:

$$\frac{ER_{20}}{R_{16}+R_{18}+R_{20}} = \frac{EP_1R_{12}}{R_{10}+R_{12}} \quad (2)$$

where $P_1$ is the dial reading of the precision decade potentiometer $R_{12}$. With switch 24 in position B and precision decade potentiometer $R_{12}$ adjusted to give a null reading on null detector 14, we may write:

$$\frac{ER_{20}}{R_{16}+R_{20}} = \frac{EP_2R_{12}}{R_{10}+R_{12}} \quad (3)$$

Equations 2 and 3 may be combined to obtain:

$$\frac{R_{20}}{P_2(R_{16}+R_{20})} = \frac{R_{20}}{P_1(R_{16}+R_{18}+R_{20})} \quad (4)$$

Expanding Equation 4, one obtains:

$$P_1(R_{16}+R_{18}+R_{20}) = P_2(R_{16}+R_{20}) \quad (5)$$

and by adding $P_2R_{18}$ to each side of Equation 5 one obtains:

$$P_1(R_{16}+R_{18}+R_{20}) + P_2R_{18} = P_2(R_{16}+R_{20}) + P_2R_{18} \quad (6)$$

which gives:

$$R_{16}+R_{18}+R_{20} = \frac{P_2R_{18}}{P_2-P_1} \cdot \frac{1}{R_{16}+R_{18}+R_{20}} = \frac{P_2-P_1}{P_2} \cdot \frac{1}{R_{18}}$$

(6.5)

and finally:

$$\frac{R_{20}}{R_{16}+R_{18}+R_{20}} = \delta = \frac{P_2-P_1}{P_2} \cdot \frac{R_{20}}{R_{18}} \quad (7)$$

With the switch 24 placed in position C and precision decade potentiometer $R_{12}$ adjusted for a null reading on null detector 14, one obtains:

$$P_3 = \frac{R_{20}}{R_{18}+R_{20}} \quad (8)$$

Rearranging Equation 8, one obtains:

$$\frac{R_{20}}{R_{18}} = \frac{P_3}{1-P_3} \quad (9)$$

Substituting Equation 9 in Equation 7, one obtains:

$$\delta = \frac{R_{20}}{R_{16}+R_{18}+R_{20}} = \frac{P_2-P_1}{P_2} \cdot \frac{P_3}{1-P_3} \quad (10)$$

where $\delta$ is the division ratio of the precision resistance potential divider. Switch 24 is now returned to position A and switch 22 placed in the operate position and the precision resistance potential divider is returned to its normal operating condition. Thus, one may readily calculate the division ratio of the precision resistance potential divider from the recorded readings $P_1$, $P_2$ and $P_3$ of the precision decade potentiometer $R_{12}$, which readings have been obtained under normal operating current and voltage conditions.

It is to be noted that one does not have to accurately know the resistance values of $R_{10}$ or $R_{12}$. It is only requisite for the present invention that one have a precision decade potentiometer which has an accurate linear setting.

The above-described techniques will furnish an accurate calibration of the precision resistance potential divider. However, if one wishes to optimize the accuracy of the calibration, the following possible errors incurred therein should be compensated therefor.

During normal operation of the precision resistance potential divider, the current through $R_{16}$ and $R_{18}$ is essentially constant over long periods of time and thermal equilibrium is reached. When switch 22 is operated in position B (for the measurement of $P_2$), the voltage across $R_{16}$ is increased and the voltage across $R_{18}$ is reduced to zero. The temperature of $R_{16}$ then begins to increase and that of $R_{18}$ to decrease and, unless the value for $P_2$ is obtained rapidly, the resistance values for $R_{16}$ and $R_{18}$ may change. In measuring $P_1$, $P_2$ and $P_3$, the expected error in calibration is directly proportional to the ratio of $R_{16}/R_{18}$. If the linear accuracy of the precision decade potentiometer $R_{12}$ is 1 p.p.m., then for a calibration accuracy of 10 p.p.m. the value of $P_1$ and $P_2$ cannot be less than 0.1 and the ratio $R_{16}/R_{18}$ cannot exceed 10. For this ratio, the power dissipated in $R_{16}$ during the measurement of $P_2$ is 21% larger than during the measurement of $P_1$ for the same value of applied voltage E in both cases. If the applied voltage E is reduced to $$\frac{R_{16}+R_{20}}{R_{16}+R_{18}+R_{20}}$$

(approximately 10/11) of its value when $P_1$ is measured, for the measurement of $P_2$, the current through $R_{16}$ and $R_{20}$ is unchanged, thereby avoiding any error incurred from temperature change in $R_{16}$ and $R_{18}$ and one may measure the value of $P_2$ unhurriedly. Changing the applied voltage E between the measurements of $P_1$ and $P_2$ results in a changing current through the calibration resistors $R_{12}$ and $R_{14}$. The effects of the voltage change may be determined by making a reading of $P_1$ at each voltage level. If there is any difference in the two values obtained for $P_1$ due to the voltage change of approximately 10%, then a plot over the entire range of voltages should be made and the appropriate correction factor evaluated therefor and applied thereto. The applied voltage E is returned to its normal value after the measurement of $P_2$.

It is to be noted that of any possible errors in the calibration of the precision resistance potential divider, the largest will be incurred during the measurement of $P_3$. As hereinbefore described, the measurement of $P_3$ provides the ratio $R_{20}/R_{18}$ and for the ultimate in precision in determining the calibration for a precision resistance potential divider one should use a more accurate measurement of this ratio than as hereinbefore described. One method is to insert an outside voltage source 28 across precision decade potentiometer $R_{12}$ during the measurement of $P_3$, as shown in FIG. 2. The magnitude of the voltage of source 28 is limited only by the ratings of the precision decade potentiometer $R_{12}$. For most cases this method will reduce error in determining $P_3$ to a level where it does not introduce any important error contribution in the calibration of the precision resistance potential divider.

A second method for reducing to a minimum any error in measuring $P_3$ comprises tapping resistance string or arm $R_{18}$ at approximately 1/10 of its value, thereby yielding $R_{18}'$ and $R_{18}''$, as shown in FIG. 3. A resistor $R_{26}$ is added in series between $R_{10}$ and $R_{12}$. Switch 24 is placed in position C to short between $R_{16}$ and $R_{10}$. A three position switch 28 is connected as shown between the tap on $R_{18}$ and the junction of $R_{26}$ and $R_{12}$. The method as hereinbefore described for measuring $P_1$, $P_2$ and $P_3$ in FIG. 1 is applied to FIG. 3 using switch 28 in place of switch 24 to thereby obtain three potentiometer settings $P_4$, $P_5$ and $P_6$. When so used the method of FIG. 3 will provide $R_{20}/(R_{18}'+R_{18}'')$ which equals $R_{20}/R_{18}$ and when substituted in Equation 10 yields a division ratio $$\delta = \frac{P_2-P_1}{P_2} \cdot \frac{P_5-P_4}{P_5} \cdot \frac{P_6}{1-P_6}$$

If a precise value for the ratio $R_{20}/R_{18}$ is known, then Equation 7, hereinbefore described, can be used to compute $\delta$, requiring only two measurements ($P_1$ and $P_2$) for calibration. The calibration should then proceed in three steps:

(a) The operating voltage E is applied for a period of time sufficient for thermal equilibrium to occur and $P_1$ is measured as hereinbefore described for FIG. 1.

(b) The voltage E is reduced to $$\frac{R_{16}+R_{20}}{R_{16}+R_{18}+R_{20}}$$

(approximately $10/11$) of its original value to maintain the same currents through $R_{16}$ and $R_{20}$ and the measurement of $P_2$ is made as hereinbefore described for FIG. 1.

(c) The values for $P_1$ and $P_2$ and the known ratio $R_{20}/R_{18}$ are substituted in Equation 7 as hereinbefore described to compute the value of $\delta$.

It is to be understood that the method of the present invention may also be applied to precision resistance variable potential dividers to effect calibration thereof. Such a precision resistance variable potential divider is illustrated in FIG. 4 together with the apparatus for effecting the calibration thereof. The precision resistance variable potential divider comprises two resistance strings or arms $R_{30}$ and $R_{32}$ and a potentiometer $R_{34}$, $R_{34}$ having a wiper arm 36 to permit a variable output from the potential divider. The potentiometer $R_{34}$ is a precision decade potentiometer having linear accuracy from 1 to 10 p.p.m. dependent upon the accuracy of the output desired. The calibration requires three resistances $R_{38}$, $R_{40}$ and $R_{42}$ and a null detector 44. It is to be noted that the values of resistances $R_{38}$, $R_{40}$ and $R_{42}$ need not be known accurately for the calibration of the precision resistance variable potential divider.

For calibration, switches 46 and 48 are switched to the A positions thereof and the wiper arm 36 of potentiometer $R_{34}$ adjusted until a null value is obtained on the null detector 44. The setting ($P_1$) of the wiper arm 36 of potentiometer $R_{34}$ is then recorded. Switches 46 and 48 are now moved to the B positions thereof, thereby shorting out the resistance arm $R_{32}$ of the precision resistance variable potential divider, and the wiper arm 36 of potentiometer $R_{34}$ is adjusted until a null is obtained on the null detector 44. The value of the setting ($P_2$) of potentiometer $R_{34}$ is recorded. Switches 46 and 48 are then moved to the C positions thereof, thereby effecting a shorting bar between the common junction of resistance arms $R_{30}$ and $R_{32}$ and the common junction of resistances $R_{38}$ and $R_{40}$. The wiper arm 36 of potentiometer $R_{34}$ is adjusted until a null is obtained on the null detector 44 and the value of the setting ($P_3$) of potentiometer $R_{34}$ is recorded. Switches 46 and 48 are then moved to the D positions thereof, thereby maintaining the shorting bar between the common junctions of resistance arms $R_{30}$ and $R_{32}$ and the common junction of resistances $R_{38}$ and $R_{40}$ and further shorting out resistance arm $R_{32}$. The wiper arm 36 of potentiometer $R_{34}$ is adjusted until a null is obtained on the null detector 44 and the value of the setting ($P_4$) of potentiometer $R_{34}$ is recorded. The aforesaid potentiometer recordings ($P_1$, $P_2$, $P_3$, $P_4$) are then used to calculate the division ratio of the precision resistance variable potential divider, the division ratio of the divider being equal to $$\delta = \frac{P_1-P_2}{P_1} \cdot \frac{P_4}{P_3-P_4}$$

From the division ratio $\delta$, one may obtain the output voltage of the divider which then is equal to $\delta E\rho$, where $E=$ the input voltage to the divider as shown in FIG. 4 and $\rho=$ the setting of the wiper arm 36 of potentiometer $R_{34}$.

Persons skilled in the art will, of course, readily adapt the teachings of the invention to methods far different than the methods herein described. Accordingly, the scope of the protection afforded the invention should not be limited to the particular method described and shown above but should be determined only in accordance with the appended claims.

What is claimed is:

1. A method of in-circuit calibration of a resistance potential divider having a plurality of resistance arms serially connected across an applied input voltage and an output taken across one of said resistance arms comprising series connecting a first resistance and a calibrated potentiometer, connecting the resistance-potentiometer combination across said divider, connecting a null indicating device between the output of said divider and the wiper arm of said potentiometer, adjusting the wiper arm of said potentiometer until said indicating device reads a null value, shorting across the resistance arm of said divider adjacent the output resistance arm thereof, adjusting the wiper arm of said potentiometer until said indicating device reads a null value therefor, removing the resistance arm short, connecting the common terminal of said output-adjacent resistance arm of said divider and a further resistance arm of said plurality of arms to the common terminal of said resistance-potentiometer combination, adjusting the wiper arm of said potentiometer until said indicating device reads a null value therefor, combining said potentiometer settings required to obtain said null values to obtain therefrom the division ratio and hence the calibration of said divider.

2. A method of in-circuit calibration of a resistance potential divider having a plurality of resistance arms serially connected across an applied input voltage and an output taken across one of said resistance arms comprising series connecting a first resistance and a calibrated potentiometer, connecting the first resistance-potentiometer combination across said divider, connecting a null indicating device between the output of said divider and the wiper arm of said potentiometer, adjusting the wiper arm of said potentiometer to a setting $P_1$ for which setting said indicating device reads a null value, shorting across the resistance arm of said divider adjacent the output resistance arm thereof, adjusting the wiper arm of said potentiometer to a setting $P_2$ for which setting said indicating device reads a null value, removing the resistance arm short, connecting the common terminal of said output-adjacent resistance arm of said divider and a further resistance arm of said plurality of arms to the common terminal of said resistance-potentiometer combination, adjusting the wiper arm of said potentiometer to a setting $P_3$ for which setting said indicating device reads a null value, and substituting the values of $P_1$, $P_2$ and $P_3$ into the equation $$\frac{P_2-P_1}{P_2} \cdot \frac{P_3}{1-P_3}$$

wherefrom the division ratio and hence the calibration of said divider is obtained.

3. A method of in-circuit calibration of a resistance potential divider having a plurality of resistance arms serially connected across an applied input voltage and an output taken across one of said resistance arms comprising series connecting a first resistance and a calibrated potentiometer, connecting the first resistance-potentiometer combination across said divider, connecting a null indicating device between the output of said divider and the wiper arm of said potentiometer, adjusting the wiper arm of said potentiometer to a setting $P_1$ for which setting said indicating device reads a null value, shorting across the resistance arm of said divider adjacent the output resistance arm thereof, adjusting the wiper arm of said potentiometer to a setting $P_2$ for which setting said indicating device reads a null value, removing the resistance arm short, connecting a voltage source across said potentiometer, connecting the common terminal of said output-adjacent resistance arm of said divider and a further resistance arm of said plurality of arms to the common terminal of said first resistance-potentiometer combination, adjusting the wiper arm of said potentiometer to a setting $P_3$ for which value said indicating device reads a null value, and substituting the values of $P_1$, $P_2$ and $P_3$ into the equation $$\frac{P_2-P_1}{P_2} \cdot \frac{P_3}{1-P_3}$$

wherefrom the division ratio and hence the calibration of said divider is obtained.

4. A method of in-circuit calibration of a resistance potential divider having first, second and third resistance arms serially connected across an applied input voltage and an output taken from the common terminal of said second and third resistance arms, comprising series connecting a fourth resistance and a calibrated potentiometer, connecting the fourth resistance-potentiometer combination across said divider, connecting a null indicating device between the output of said divider and the wiper arm of said potentiometer, adjusting the wiper arm of said potentiometer to a setting $P_1$ for which setting said indicating device reads a null value, reducing the input voltage to said divider to a value approximately $10/11$ the normal value thereof, shorting across said second resistance arm of said divider, adjusting the wiper arm of said potentiometer to a setting $P_2$ for which setting said indicating device reads a null value, removing the second resistance arm short, restoring the input voltage to said divider to the normal value thereof, connecting the common terminal of said first and second resistance arms to the common terminal of said fourth resistance-potentiometer combination, adjusting the wiper arm of said potentiometer to a setting $P_3$ for which setting said indicating device reads a null value, and substituting the values of $P_1$, $P_2$ and $P_3$ into the equation $$\frac{P_2-P_1}{P_2} \cdot \frac{P_3}{1-P_3}$$

wherefrom the division ratio and hence the calibration of said divider is obtained.

5. A method of in-circuit calibration of a resistance potential divider having first, second and third resistance arms serially connected across an applied input voltage and an output taken from the common terminal of said second and third resistance arms comprising series connecting a fourth resistance and a calibrated potentiometer, connecting the fourth resistance-potentiometer combination across said divider, connecting a null indicating device between the output of said divider and the wiper arm of said potentiometer, adjusting the wiper arm of said potentiometer to a setting $P_1$ for which setting said indicating device reads a null value, reducing the input voltage to said divider to a value approximately $10/11$ the normal value thereof, shorting across said second resistance arm of said divider, adjusting the wiper arm of said potentiometer to a setting $P_2$ for which setting said indicating device reads a null value, removing said second resistance arm short, restoring the input voltage to said divider to the normal value thereof, connecting a voltage source across said potentiometer, connecting the common terminal of said first and second resistance arms to the common terminal of said fourth resistance-potentiometer combination, adjusting the wiper arm of said potentiometer to a setting $P_3$ for which setting said indicating device reads a null value, and substituting the values of $P_1$, $P_2$ and $P_3$ into the equation $$\frac{P_2-P_1}{P_2} \cdot \frac{P_3}{1-P_3}$$

wherefrom the division ratio and hence the calibration of said divider is obtained.

6. A method of in-circuit calibration of a resistance potential divider having first, second and third resistance arms serially connected across an applied input voltage and an output taken from the common terminal of said second and third resistance arms, comprising series connecting a fourth resistance and a calibrated potentiometer, connecting the fourth resistance-potentiometer combination across said divider, connecting a null indicating device between the output of said divider and the wiper arm of said potentiometer, adjusting the wiper arm of said potentiometer to a setting $P_1$ for which setting said indicating device reads a null value, shorting across said second resistance arm of said divider, adjusting the wiper arm of said potentiometer to a setting $P_2$ for which setting said indicating device reads a null value, removing the second resistance arm short, connecting a tap to said second resistance arm, connecting a fifth resistance between said fourth resistance and said potentiometer in series therewith, connecting a short between the common terminal of said first and second resistance arms and the common terminal of said fourth and fifth resistances, adjusting the wiper arm of said potentiometer to a value $P_3$ for which setting said indicating device reads a null value, shorting between said second resistance arm tap and the common terminal between said second and third resistance arms, adjusting the wiper arm of said potentiometer to a setting $P_4$ for which setting said indicating device reads a null value, removing the short from said tap and the second-third resistance terminal, connecting said tap to the common terminal of said fourth resistance-potentiometer combination, adjusting the wiper arm of said potentiometer to a setting $P_5$ for which setting said indicating device reads a null value, and substituting the values of $P_1$, $P_2$, $P_3$, $P_4$ and $P_5$ in the equation $$\frac{P_2-P_1}{P_2} \cdot \frac{P_4-P_3}{P_4} \cdot \frac{P_5}{1-P_5}$$

wherefrom the division ratio and hence the calibration of said divider is obtained.

7. A method of in-circuit calibration of a resistance potential divider having first, second and third resistance arms serially connected across an applied input voltage and an output taken from the common terminal of said second and third resistance arms, comprising series connecting a fourth resistance and a calibrated potentiometer, connecting the fourth resistance-potentiometer combination across said divider, connecting a null indicating device between the output of said divider and the wiper arm of said potentiometer, adjusting the wiper arm of said potentiometer to a setting $P_1$ for which setting said indicating instrument reads a null value, reducing the input voltage to said divider to a value approximately $10/11$ the normal value thereof, shorting across said second resistance arm of said divider, adjusting the wiper arm of said potentiometer to a setting $P_2$ for which setting said indicating device reads a null value, removing the second resistance arm short, restoring the input voltage to said divider to the normal value thereof, connecting a tap to said second resistance arm, connecting a fifth resistance between said fourth resistance and said potentiometer in series therewith, connecting a short between the common terminal of said first and second resistance arms and the common terminal of said fourth and fifth resistances, adjusting the wiper arm of said potentiometer to a value $P_3$ for which setting said indicating device reads a null value, shorting between said second resistance arm tap and the common terminal between said second and third resistance arms, adjusting the wiper arm of said potentiometer to a setting $P_4$ for which setting said indicating device reads a null value, removing the short from said tap and the second-third resistance terminal, connecting said tap to the common terminal of said fourth resistance-potentiometer combination, adjusting the wiper arm of said potentiometer to a setting $P_5$ for which setting said indicating device reads a null value, and substituting the values of $P_1$, $P_2$, $P_3$, $P_4$ and $P_5$ in the equation $$\frac{P_2-P_1}{P_2} \cdot \frac{P_4-P_3}{P_4} \cdot \frac{P_5}{1-P_5}$$

wherefrom the division ratio and hence the calibration of said divider is obtained.

8. A method of in-circuit calibration of a resistance variable potential divider having first and second resistance arms and a potentiometer serially connected across an applied input voltage and an output taken from the wiper arm of said potentiometer, comprising series connecting first, second and third resistances, connecting the series connected first, second and third resistance combination across said divider, connecting a null indicating device between the wiper arm of the potentiometer of said divider and the common junction of said second and third resistance, adjusting the wiper arm of said potentiometer of said divider until said indicating device reads a null value, shorting across the resistance arm of said divider adjacent said potentiometer of said divider, adjusting the wiper arm of said potentiometer of said divider until said indicating device reads a null value therefor, removing the resistance arm short, connecting the common terminal of the resistance arms of said divider to the common terminal of said first and second resistances, adjusting the wiper arm of the potentiometer of said divider until said indicating device reads a null value therefor, maintaining the common terminal connection to said resistance arms and said resistances while shorting across the resistance arm of said divider adjacent the potentiometer of said divider, adjusting the wiper arm of the potentiometer of said divider until said indicating device reads a null value therefor, combining said potentiometer settings required to obtain said null values to obtain therefrom the division ratio and hence the calibration of said divider.

9. A method of in-circuit calibration of a resistance variable potential divider having first and second resistance arms and a potentiometer serially connected across an applied input voltage and having an output taken from the wiper arm of said potentiometer, comprising series connecting first, second and third resistances, connecting the first, second and third resistance combination across said divider, connecting a null indicating device between the wiper arm of the potentiometer of said divider and the common terminal of said second and third resistances, adjusting the wiper arm of the potentiometer of said divider to a setting $P_1$ for which setting said indicating device reads a null value, shorting across the resistance arm of said divider adjacent the potentiometer of said divider, adjusting the wiper arm of the potentiometer of said divider to a setting $P_2$ for which setting said indicating device reads a null value, removing the resistance arm short, connecting the common terminal of the first and second resistance arms of said divider and the common terminal of said first and second resistances, adjusting the wiper arm of the potentiometer of said divider to a setting $P_3$ for which setting said indicating device reads a null value, maintaining the common terminal connection to said resistance arms and said resistances while shorting across the resistance arm of said divider adjacent the potentiometer of said divider, adjusting the wiper arm of the potentiometer of said divider to a setting $P_4$ for which setting said indicating device reads a null value, and substituting the values of $P_1$, $P_2$, $P_3$ and $P_4$ into the equation $$\frac{P_1-P_2}{P_1} \cdot \frac{P_4}{P_3-P_4}$$

wherefrom the division ratio and hence the calibration of said divider is obtained.

No references cited.

RUDOLPH V. ROLINEC, *Primary Examiner.*

E. E. KUBASIEWICZ, *Assistant Examiner.*